United States Patent [19]

Blake et al.

[11] 4,339,338

[45] Jul. 13, 1982

[54] METHOD OF REDUCING THE STRENGTH OF ADHESION OF SOLID PARTICULATE MATERIALS TO METAL SURFACES

[75] Inventors: Robert J. Blake, Yorktown Heights; Joseph E. Sokolik, Jr., Carmel; Samuel Sterman, Chappaqua, all of N.Y.

[73] Assignee: Union Carbide Corporation

[21] Appl. No.: 189,630

[22] Filed: Sep. 22, 1980

[51] Int. Cl.³ .................... C09K 3/18

[52] U.S. Cl. .................... 252/70; 44/6; 106/13

[58] Field of Search .................... 252/70; 44/6; 106/13

[56] References Cited

U.S. PATENT DOCUMENTS

| | | | |
|---|---|---|---|
| 1,960,917 | 5/1934 | Nagelvoort | 44/6 |
| 2,812,264 | 11/1957 | Goms | 106/13 |
| 3,794,472 | 2/1974 | Macaluso | 44/6 |
| 4,225,317 | 9/1980 | Kugel | 44/6 |
| 4,254,166 | 3/1981 | Glanville | 106/13 |

OTHER PUBLICATIONS

Surface Active Agents, Schwartz, 1949 pp. 6, 7, 229–231.

*Primary Examiner*—Sam Silverberg
*Attorney, Agent, or Firm*—Donald M. Papuga

[57] ABSTRACT

This invention is directed to a method for reducing the strength of adhesion of solid particulate materials to metal surfaces as occurs under water freezing conditions by coating the metal surface with a mixture comprising a hydrocarbon liquid which has a solidification or pour point not greater than 0° F. and a saturated or unsaturated fatty acid having from about 10 to about 18 carbon atoms.

14 Claims, No Drawings

METHOD OF REDUCING THE STRENGTH OF ADHESION OF SOLID PARTICULATE MATERIALS TO METAL SURFACES

BACKGROUND OF THE INVENTION

This invention is directed to reducing the strength of adhesion of solid particulate materials, such as, for example, coal, to metal surfaces under freezing conditions causing ice formation between the materials and metal. In particular, this invention is directed to coating metal surfaces, such as the sides and bottoms of containers for storing or transporting coal, such as hopper cars, with a mixture comprising a particular hydrocarbon liquid and fatty acid which prevents moist coal from adhering to the sides or bottoms of said containers under low temperature (i.e., freezing) conditions.

Solid particulate materials, such as coal, are known to freeze when the surfaces are wet and under freezing conditions to the metal surfaces of the containers which are used to store or transport them, such as hopper cars. It is very difficult to remove the coal from the containers under these conditions. Mechanical means must be used to free the coal. However, this is time consuming and may cause damage to the car, as for example which the sides of the car are hammered in an attempt to free the coal.

The industry has attempted to solve this problem by various techniques such as by heating the hopper cars in sheds using thermal heaters. However, besides being time consuming and expensive in the energy required to operate the heaters, the heat generated by the thermal heaters can cause damage to the hopper car by, for example, weakening or melting the pneumatic lines if the heat is not carefully controlled.

In order to avoid the disadvantages occasioned by heating the cars, the surfaces of the cars which come in contact with moist coal under freezing conditions have been coated with hydrocarbon liquids, such as fuel oils. However, this technique is not effective in reducing the strength of adhesion of the frozen coal to the metal surfaces which they are in contact with.

U.S. Pat. No. 3,794,472, issued Feb. 26, 1974, describes that coal particles are prevented from freezing together and/or to the surfaces of coal storage containers by coating either the coal particles and/or the surfaces of said storage containers with a thin film of a composition comprising a hydrocarbon liquid which has emulsified therewith from 5 to 75% by weight of an aqueous solution of a polyhydric alcohol.

The sole formulation in the patent is described as containing the following ingredients: 50 percent by weight of Fuel oil—#2 Diesel, 24 percent by weight of ethylene glycol, 24 percent by weight of water and 2 percent by weight of an emulsifier which is a 50:50 weight blend of nonylphenol reacted with 9 moles of ethyleneoxide and pentaerythritol etherified with oleic acid.

In column 3, of this patent, there is described that coal particles being dropped from a storage hopper into a standard hopper type coal car are sprayed with such a composition. Also, the patent states that prior to spraying the coal, the inside surfaces of the hopper car had been sprayed with 3 gallons of the composition. After the coal was loaded into the hopper car, the outside temperature was determined to be 20° F. The patent then states that the coal in the hopper car was transported to an unloading site, allowed to stand for a day and then emptied. Lastly, the patent states that the coal was readily emptied from the hopper car without any mechanical or other means being needed to unload the car.

However, at low temperatures such an emulsion has a tendency to separate into a water and an oil phase and thus become ineffective.

Thus, there exists a need for a material which will coat the metal surfaces of a container so that the adhesion of moist coal to the metal surfaces will be minimal under water freezing conditions so that the coal can be emptied from the container without the use of mechanical means or without the use of thermal heaters.

THE INVENTION

This invention is directed to a method for reducing the strength of adhesion of solid particulate materials to metal surfaces as occurs under water freezing conditions by coating the metal surface in contact with the solid particulate material with a mixture comprising a hydrocarbon liquid which has a solidification or pour point not greater than 0° F. and a saturated or unsaturated fatty acid having from about 10 to about 18 carbon atoms.

The metal surface(s) of the container which will be in contact with the moist coal is coated with the aforedefined mixture. The metal surface of the container is generally steel, aluminum, etc. The container is used to store or transport the coal and is generally a hopper type coal car.

The hydrocarbon liquid suitable for use in this invention is selected from one or more liquid aliphatic, aromatic and/or naphthenic hydrocarbons which have a solidification or pour point at not greater than 0° F. These liquids include No. 2 fuel oil, diesel oil, kerosene, turbo fuel, and the like. Mixtures of hydrocarbon liquids may also be used.

The saturated or unsaturated fatty acids suitable for use herein contain from about 10 to about 18 carbon atoms. The preferred acids include oleic and linoleic acids because of their low melting point and low water solubilities.

The mixture of this invention contains from about 25 to about 95, preferably from about 75 to about 90 weight percent of hydrocarbon liquid and from about 5 to about 75, preferably from about 10 to about 25 weight percent of the saturated or unsaturated fatty acid.

The metal surface is coated with about one gallon per 500 square feet of metal surface, of the mixture of this invention. Larger or smaller amounts can be employed depending upon the type of surface coated. If the metal surface is rusted and pitted, amounts of the mixture as high as about 2 gallons per 500 square feet of metal surface may be required. However, if the metal surface is smooth, the mixture may be used in amounts of about 0.5 gallons per 500 square feet of metal surface.

The metal surface of the container may be coated with the mixture of this invention by, for example, spraying the desired amount of the mixture onto the metal surface prior to loading the container.

EXAMPLES

The following examples serve to give specific illustrations of the practice of this invention but they are not intended in any way to limit the scope of this invention.

PREPARATION AND TESTING OF SPECIMENS

Wet coal samples are frozen to treated and untreated, clean as well as heavily rusted carbon steel plates. The frozen coal specimens are held stationary and, by means of a mechanical tester, the force required to shear the plates from the frozen coal is measured and recorded.

The coal employed was minus 30 U.S. mesh (passed 30 U.S. mesh screen; 595 micron mesh) Eastern bituminous type coal. The surface and inherent moisture content of the coal is measured according to the procedure described in ASTM- Method D-3302-74.

Carbon steel plates ⅛ inch thick and 4×4 inches square are degreased by soaking in toluene for one hour and rinsing with acetone. The steel is activated and cleaned by soaking the plates in a 10% by weight hydrochloric acid solution for one hour. The plates are rinsed with water and then with acetone. The plates are polished with a steel wire brush. These "clean" steel plates are ready for testing. The "rusted" steel plates are prepared by degreasing and soaking in the hydrochloric acid solution as described above. The plates are rinsed with water and suspended in an air sparged salt water bath (approximately 1000 parts per million of sodium chloride) for 24 hours. The plates are carefully rinsed with water and air dried. The plates exhibit a heavy red rust ($Fe_2O_3$).

The mixture to be tested is applied to the steel plate to be tested (either "clean" or "rusted" steel plates) with a one-inch wide paint brush and the amount of the mixture applied is determined by measuring the weight gain of the plate. The following equation approximates the application rate in gallons based on a 100 ton hopper rail car (about 1500 ft$^2$ of metal surface area to be treated):

$$R=(0.3964\times B)/(A\times G)$$

wherein R is the application rate in gallons/1500 ft.$^2$; B is the grams of mixture applied per test plate; A is the area of the test plate (ft.$^2$) and G is the specific gravity of the testing mixture.

A cylindrical poly(vinyl chloride) pipe 4 inches long and 2½ inches in diameter (SCH 40 PVC pipe) is placed onto the center of the steel plate treated with the mixture, as previously described, and secured with rubber bands. Grooves are cut (approximately ⅛ inch wide and ¼ inch deep) into the upper lip of the pipe to prevent the rubber bands from slipping during handling.

A 150 gram sample of the dried coal, to which 50 grams of water has been added to adjust its moisture content to 25 percent, is placed into the cylinder. A 13.635 pound steel weight (6,185 grams) having an outside diameter of 2.40 inches is inserted into the top of the cylinder to compress the coal.

The assembly is placed on a laboratory shaker and vibrated for 30 seconds. The 6,185 gram weight is designed to simulate the compressive forces exerted on the bottom of a coal car by a column of coal eight-feet high (2.778 psi).

The top of the cylinder is sealed with a Number 13 rubber stopper, to prevent moisture loss, and the assembly is placed in a mechanical freezer operating at 10°±2° F. for 18–24 hours.

The assembly is removed from the freezer, the rubber bands cut, and the assembly is placed on a holder which is 3½ inches wide, 3 inches high, 6-5/32 inches long, wherein the top half of the holder is cut into a half circle of 1-7/16 inches deep to accommodate the shape of the cylindrical pipe. A 5/32 inch groove is cut to a depth of 2½ inches three inches from the edge of the side. The holder sits on a steel platen which is connected to the load cell (4,500 kg) of an Instron Model TTC physical testing machine.

The platen, holder and specimen are all enclosed in a cold box, fabricated around the load cell, which maintains the specimen temperature at 10°±4° F. during testing. An insulated driver (a 2×4×12 inch wooden block) is placed between the top edge of the steel plate and the Instron's upper platen, which is connected to a moveable crosshead, and the crosshead is lowered by an electric drive at a constant rate of 2.5 inches (6.35 cm) per minute. The pounds force required to shear the plate from the frozen coal is recorded. The corresponding adhesive strength is converted to pounds per square inch units by dividing by the contact area between the coal and the plate which is 4.784 square inches for the samples used herein, according to the following equation:

$$\text{Adhesive Strength(psi)} = \text{Force(pounds)}/4.784(\text{in}^2)$$

In the following Controls and Examples, "rusted" steel prepared, as described above, was used as the test specimen.

CONTROL A

A 4×4×⅛ inch "rusted" steel plate was prepared and tested as described in the Preparation and Testing of Specimens, supra. The surface of the steel plate was not treated with any additive.

The adhesive strength is set forth in Table I. The numerical value of the adhesive strength is the average of the number of specimens tested, and is set forth in Table I.

CONTROL B

The procedure of Control A was exactly repeated except that the steel plates were treated with 5.4 grams/ft.$^2$ of kerosene.

The results are shown in Table I.

EXAMPLE 1

The procedure of Control A was exactly repeated except that the steel plates were treated with 5.4 grams/ft.$^2$ of a mixture of 90 percent of kerosene and 10% of oleic acid.

The results are shown in Table I.

EXAMPLE 2

The procedure of Control A was exactly repeated except that the steel plates were treated with 5.4 grams/ft.$^2$ of a mixture of 85 percent of kerosene and 15% of oleic acid.

The results are shown in Table I.

EXAMPLE 3

The procedure of Control A was exactly repeated except that the steel plates were treated with 5.4 grams/ft.$^2$ of a mixture of 80 percent of kerosene and 20 percent of oleic acid.

The results are shown in Table I.

EXAMPLE 4

The procedure of Control A was exactly repeated except that the steel plates were treated with 5.4 grams/ft.$^2$ of a mixture of 75 percent of kerosene and 25 percent of oleic acid.

The results are shown in Table I.

The data in Table I show that the mixtures of this invention are effective in reducing the strength of ice in association with coal and metal surfaces.

TABLE I

| Example | No. of specimens tested | Adhesive strength (psi) |
|---|---|---|
| Control A | 16 | 90.9 |
| Control B | 20 | 51.6 |
| 1 | 4 | 3.9 |
| 2 | 4 | 1.7 |
| 3 | 4 | 1.2 |
| 4 | 4 | 2.3 |

In the following Controls and Example, "clean" steel prepared, as described above, was used as the test specimen.

CONTROL C

A 4×4×⅛ inch "clean" steel plate was prepared and tested as described in the Preparation and Testing of Specimens, supra. The surface of the steel plate was not treated with any additive.

The adhesive strength is set forth in Table II. The numerical value of the adhesive strength is the average of the number of specimens tested and is set forth in Table II.

CONTROL D

The procedure of Control C was exactly repeated except that the steel plates were treated with 3.6 grams/ft.$^2$ of kerosene.

The results are shown in Table II.

EXAMPLE 5

The procedure of Control C was exactly repeated except that the steel plates were treated with 3.6 grams/ft.$^2$ of a mixture of 90 percent of kerosene and 10 percent of oleic acid.

The results are shown in Table II.

TABLE II

| Example | No. of specimens tested | Adhesive strength (psi) |
|---|---|---|
| Control C | 12 | 64.3 |
| Control D | 12 | 8.4 |

TABLE II-continued

| Example | No. of specimens tested | Adhesive strength (psi) |
|---|---|---|
| 5 | 8 | 1.1 |

What is claimed is:

1. A method for reducing the strength of adhesion of solid particulate materials to metal surfaces as occurs under water freezing conditions by coating the metal surfaces to be in contact with the particulate material with a mixture comprising a hydrocarbon liquid, which has a solidification or pour point not greater than 0° F., and a saturated or unsaturated fatty acid having from about 10 to about 18 carbon atoms.

2. A method as defined in claim 1, wherein the solid particulate material comprises coal.

3. A method as defined in claim 1, wherein the hydrocarbon liquid is selected from No. 2 fuel oil, diesel oil, kerosene or turbo fuel.

4. A method as defined in claim 1, wherein the fatty acid is oleic acid.

5. A method as defined in claim 1, wherein the fatty acid is linoleic acid.

6. A method as defined in claim 1, wherein the mixture contains from about 25 to about 95 weight percent of the hydrocarbon liquid.

7. A method as defined in claim 6, wherein the mixture contains from about 75 to about 90 weight percent of the hydrocarbon liquid.

8. A method as defined in claim 1, wherein the mixture contains from about 5 to about 75 weight percent of the fatty acid.

9. A method as defined in claim 1, wherein the mixture contains from about 10 to about 25 weight percent of the fatty acid.

10. A method for reducing the strength of adhesion of solid particulate materials to metal surfaces as occurs under water freezing conditions by coating the metal surfaces in contact with the particulate material with a mixture comprising from about 75 to about 90 weight percent of a hydrocarbon liquid selected from No. 2 fuel oil, diesel oil, kerosene, or turbo fuel, and from about 10 to about 25 weight percent of a fatty acid.

11. A method as defined in claim 10, wherein the hydrocarbon liquid is kerosene.

12. A method as defined in claim 10, wherein the fatty acid is oleic acid.

13. A method as defined in claim 10, wherein the hydrocarbon liquid is kerosene and the fatty acid is oleic acid.

14. A method as defined in claims 10 or 11, or 12 or 13 wherein the solid particulate material comprises coal.

* * * * *